Figure 1:
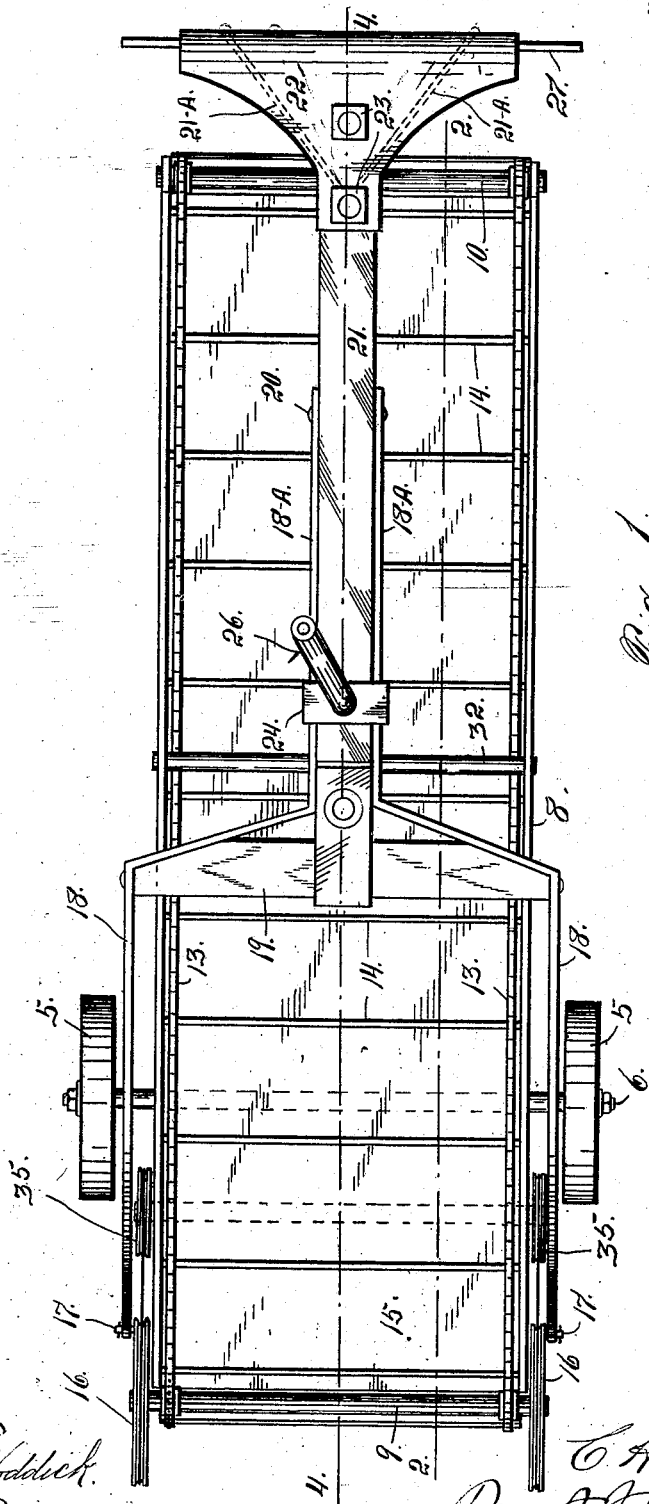

No. 867,499. PATENTED OCT. 1, 1907.
C. H. GUNN.
DIGGER OR SCRAPER.
APPLICATION FILED FEB. 4, 1907.

3 SHEETS—SHEET 1.

Witnesses
Otto E Hoddick.
Dena Nelson.

Inventor
C H Gunn.
By A. J. Bader
Attorney

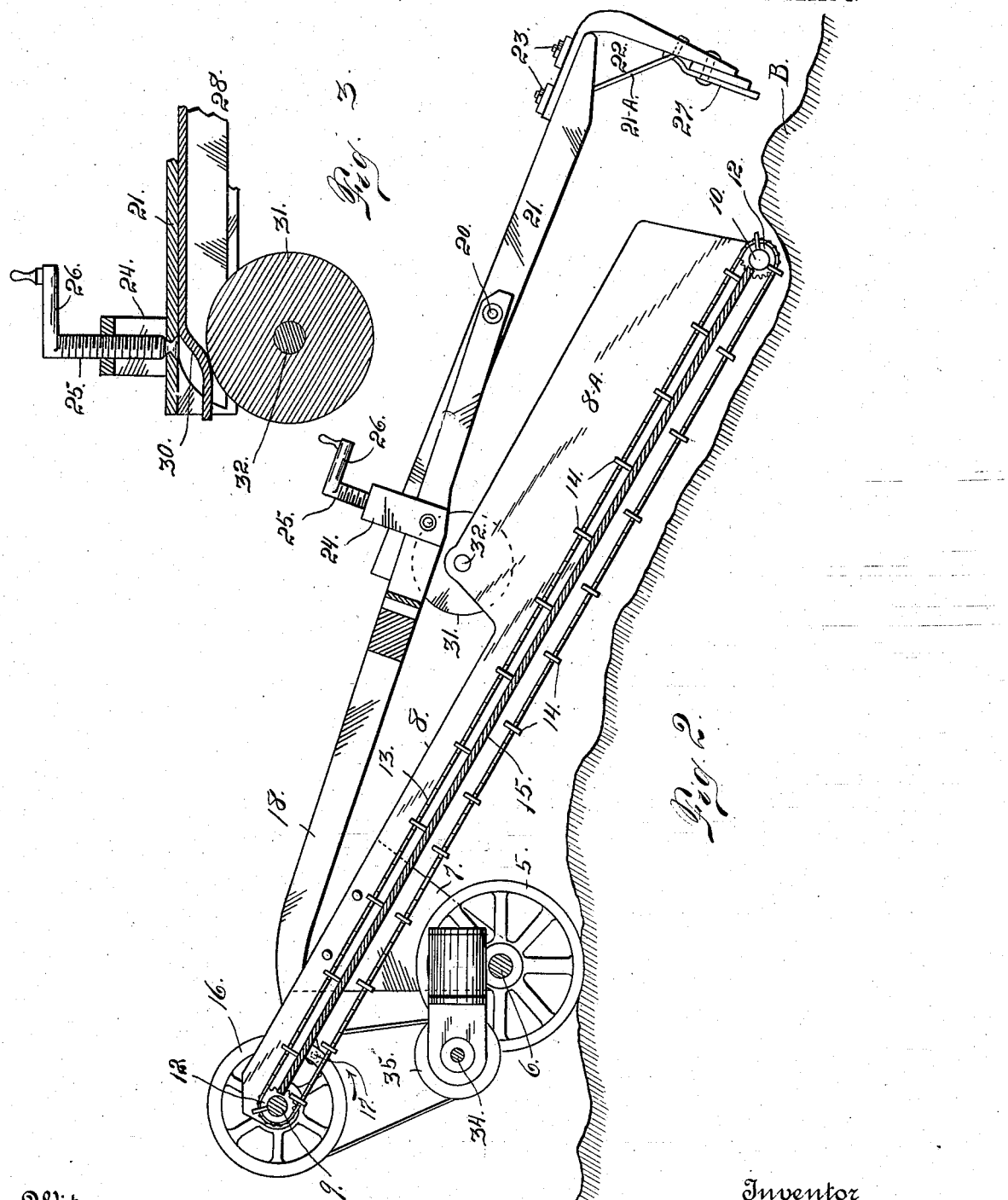

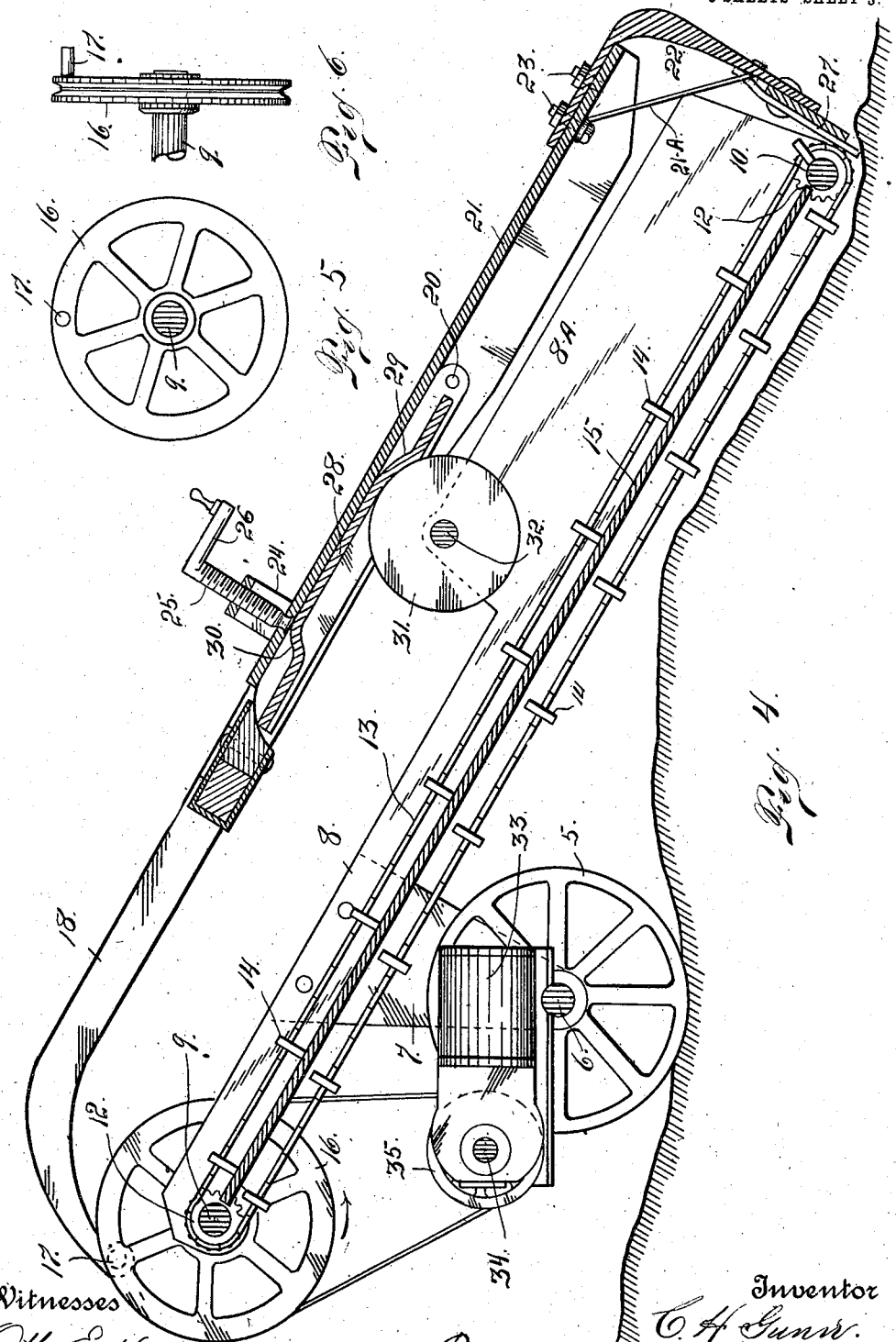

UNITED STATES PATENT OFFICE.

CHARLES H. GUNN, OF MARYSVILLE, CALIFORNIA.

DIGGER OR SCRAPER.

No. 867,499.　　　Specification of Letters Patent.　　　Patented Oct. 1, 1907.

Application filed February 4, 1907. Serial No. 355,747.

*To all whom it may concern:*

Be it known that I, CHARLES H. GUNN, a citizen of the United States, residing at Marysville, in the county of Yuba and State of California, have invented certain new and useful Improvements in Diggers or Scrapers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in digging or scraping apparatus and the invention will be fully understood by reference to the accompanying drawing in which, Figure 1 is a top plan view of my improved apparatus. Fig. 2 is a section taken on the line 2—2 Fig. 1. Fig. 3 is a sectional view illustrating a part of the apparatus shown on a larger scale. Fig. 4 is a central longitudinal section taken on the line 4—4 Fig. 1. Fig. 5 is a section taken through one of the end drums or shafts showing the operating pulley in side elevation. Fig. 6 is a view of the same construction looking at the edge of the wheel or at right angles to Fig. 5.

The same reference characters indicate the same parts in all the views.

Let the numeral 5 designate ground wheels mounted on an axle 6 upon which is mounted an upright frame 7 to which is secured a longitudinally disposed carrier frame 8 in the extremities of which are journaled shafts 9 and 10, to which are made fast sprocket wheels 12 which are engaged by endless chains 13. There are two sprockets on each shaft 9 and they are located near the opposite extremity of the shaft. The chains 13 are connected by slats 14 which form flights and engage a plate 15 secured to the frame 8 and located between the sides of the said frame. The extremities of the plate 15, occupy positions in close proximity to the respective carrier shafts 9 and 10.

To the opposite extremities of the carrier shaft 9, are secured pulley wheels or sheaves 16 which are provided near their outer peripheries with wrist pins 17 to which are connected the two members 18 of a pitman yoke provided with a cross bar 19 connecting the two arms of the pitman. From this cross bar the pitman arms extend rearwardly as shown at 18^A, their rear extremities being pivotally connected as shown at 20 with an arm 21 connected with the digger or scraper 22 by means of bolts 23. The arm 21 extends forwardly between the pitman arms 18^A. To the last named arms is secured a U-shaped upwardly projecting frame 24 in which is threaded an adjusting screw 25, the lower extremity of the screw being journaled in the digger arm 21. The upper extremity of this screw is provided with a crank arm 26 for manipulating purposes. By turning this screw, the angle of the arm 21 with the pitman arms 18 may be regulated. The arm 21 is freely movable between the pitman arms 18^A by the use of the adjusting screw 25. When, however, the arm 21 is properly adjusted with reference to the pitman arms, this relation is maintained by means of the screw. The scraper or digger proper extends downwardly from the rear extremity of the arm 21, and is provided at its lower or digging extremity with a detachable blade 27. Most of the wear upon the digging or scraping device proper, comes upon this blade and when the latter becomes worn and is no longer fit for use, it may be removed and a new one substituted at a comparatively small expense, thus obviating the expense of renewing the entire digging or scraping device.

The arm 21 is U-shaped in cross section, and between the opposite side members of this arm is located an inverted trough-shaped guide 28 having cams 29 and 30 at its opposite extremities which may be formed by bending down the top wall of the integral inverted trough-shaped structure, slits being formed to permit the bending down of the top wall. This guide is pivotally connected with the arm 21 by means of the pivot pin 20 which forms the connection between the pitman yoke and the said arm.

A wheel 31 is mounted to rotate, being supported by a shaft 32 engaging the side walls of the frame 8, the rear portions of the said side walls being considerably higher than the forward portions thereof. This wheel 31 engages the guide 28, and forms a rolling support for the digger arm during the operation of the machine. This wheel 31 by virtue of its engagement with the member 28, forms a guide wheel whereby the digger or scraper arm is prevented from moving laterally in either direction during the operation of the machine. It will be understood that when the digger arm is raised the guide trough is free to move downwardly and maintain its position with reference to the wheel 31, the latter in connection with the trough still forming a guide whereby the digger or scraper arm is held in proper alinement.

The endless carrier, together with the digger or scraper mechanism proper, is operated from an engine or motor 33, mounted on the axle 6 between the wheels of the vehicle. Upon the power shaft 34 of this motor are mounted pulley wheels or sheaves 35 which are connected with the sheaves 16 mounted on the shaft 9 of the endless carrier. Hence when the power shaft 34 is rotated, the shaft 9 and the endless carrier are actuated. The rotation of the sheaves 16, also imparts a reciprocating movement to the digger or scraper mechanism, through the instrumentality of the pitman yoke as heretofore described, while the guide wheel 31 together with the trough-shaped guide engaging the same, imparts the proper movement to the digger or scraper. If we assume that the apparatus is in the position shown in Fig. 2, or that the digger is at its extreme rearward limit of movement, then as the wheels 16 continue their rotation in the direction indicated by the arrow, the guide 28 is moved forwardly, and the digger and its connections allowed to drop sufficiently to engagement with the ground B or material upon which it is acting. This sudden drop of the digger, causes its cutting edge or blade to sink into the earth, then as the digger is moved forwardly by the continued rotation of the sheaves 16, the digger carries the dirt toward the lower extremity of the carrier, and just as the digger reaches the carrier, the guide wheel 31 engages the cam 29 of the trough-shaped guide which cam imparts a sudden upward movement to the digger which has also a slight forward movement, thus throwing the dirt upon the carrier. The flights of this carrier being in continuous operation, drag the dirt upwardly over the plate 15, and discharge it at the upper extremity of the said plate. Wagons may be driven along in order to receive this discharge or it may fall upon any device for removing it or upon the ground as may be desired.

As shown in the drawing the digger or scraper 22 is further connected with the arm 21 by tie rods 21$^A$ whose upper extremities are connected with the said arm by one of the bolts 23 while the lower extremities of the rods, pass through the digger and are headed on the outside. It is evident that the function of these rods, is to strengthen this part of the structure which it will be understood is liable to be subjected to considerable strain.

Having thus described my invention, what I claim is:

1. In a digger or scraper, the combination with a frame, an endless conveyer or carrier mounted on the frame, wheels also mounted on the said frame, a digger or scraper, and a crank connection between the latter and said wheels, whereby the digger or scraper is made to coöperate with the carrier, substantially as described.

2. The combination with a frame, of an endless conveyer mounted thereon, wheels also mounted on the frame, a scraper or digger, a pitman connection between the latter and the wheels, and means for preventing the lateral displacement of the digger during the operation of the machine, substantially as described.

3. In apparatus of the class described, the combination with a frame, an endless conveyer mounted thereon, wheels for operating the conveyer, a digger or scraper, and a pitman connection between the latter and the said operating wheels, substantially as described.

4. The combination of a frame, an endless conveyer mounted thereon, wheels connected with the conveyer shaft at one extremity, a digger or scraper, a pitman connection between the latter and the said wheels, a guide wheel mounted on the frame, and a trough-shaped guide connected with the digger and engaging the said guide wheel to prevent lateral displacement of the digger, substantially as described.

5. The combination with a frame, a conveyer mounted thereon, wheels connected in operative relation with the conveyer, a digger provided with a forwardly projecting arm, a pitman adjustably connected with the digger at one extremity, the opposite extremity of the pitman having a crank connection with the said wheels, substantially as described.

6. The combination with a frame, a conveyer mounted thereon, wheels for operating the conveyer, a digger having a forwardly projecting arm, a pitman connecting the digger with the said wheels, a guide wheel journaled in the frame intermediate its extremities, a trough-shaped guide pivotally connected with the digger arm, whereby the guide is adapted to swing independently of the said arm, the guide engaging the guide wheel and being provided with cam members at its extremities for controlling the manipulation of the digger during the operation of the machine, substantially as described.

7. The combination with a frame, operating wheels mounted thereon, a digger or scraper, a crank connection between the digger or scraper and the operating wheels for imparting a reciprocating movement to the digger or scraper, and suitable means acting on the latter to produce a vertical movement simultaneously with the reciprocating action imparted by the operating wheel, substantially as described.

8. The combination with a suitable frame, of operating wheels mounted thereon, a digger or scraper provided with a forwardly projecting arm, a pitman having a crank connection with the operating wheels, and an adjustable connection between the pitman and the digger arm, substantially as described.

In testimony whereof I affix my signature in presence of two witnesses.

CHARLES H. GUNN.

Witnesses:
FRANK LANE,
C. S. INGLEROCK.